United States Patent
Crichton

(10) Patent No.: US 6,507,569 B1
(45) Date of Patent: Jan. 14, 2003

(54) DYNAMIC CONTROL OF CELLULAR RADIO COMMUNICATION SYSTEM RESOURCES

(75) Inventor: Paul Crichton, Newbury (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/284,676

(22) Filed: Apr. 16, 1999

(51) Int. Cl.⁷ .................................................. H04Q 7/20
(52) U.S. Cl. ...................... 370/329; 370/330; 370/341; 370/431; 370/468; 455/67.3
(58) Field of Search ................................. 370/329, 330, 370/341, 431, 468; 455/63, 67.3

(56) References Cited

U.S. PATENT DOCUMENTS

| | | | | |
|---|---|---|---|---|
| 5,963,548 A | * | 10/1999 | Virtanen | 370/335 |
| 5,974,236 A | * | 10/1999 | Sherman | 340/825.02 |
| 6,016,311 A | * | 1/2000 | Gilbert et al. | 370/280 |
| 6,031,827 A | * | 2/2000 | Rikkinen et al. | 370/330 |
| 6,097,733 A | * | 8/2000 | Basu et al. | 370/329 |

* cited by examiner

Primary Examiner—Thanh Cong Le
Assistant Examiner—Alan T. Gantt

(57) ABSTRACT

A method of optimising the operation of a cellular radio communication system in which the demands made by users of the system are monitored and resources are allocated to the users accordingly.

13 Claims, 3 Drawing Sheets

DYNAMIC CONTROL OF CELLULAR RADIO COMMUNICATION SYSTEM RESOURCES

Figure 1:
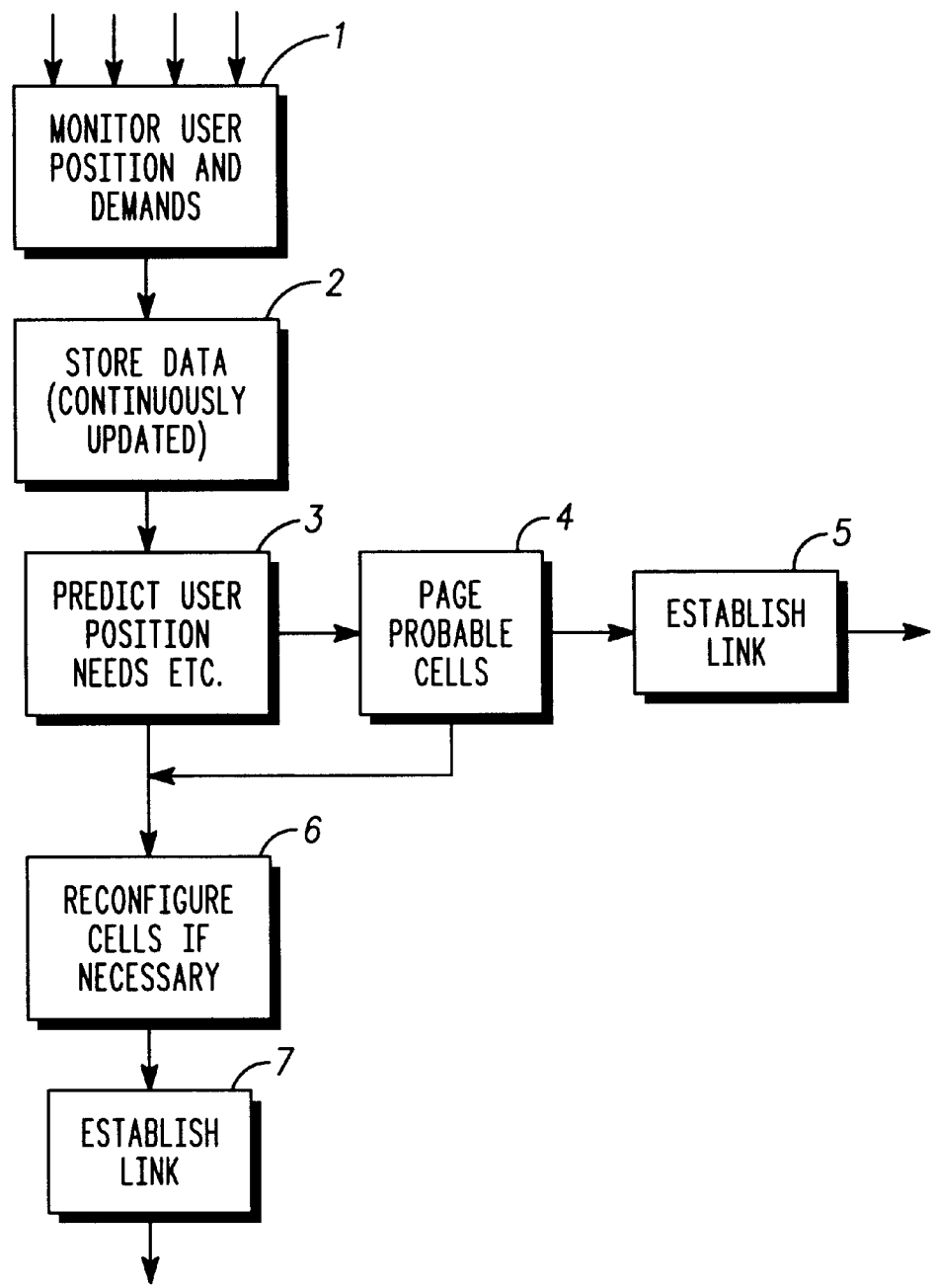

The present invention relates to cellular radio communication systems.

Cellular radio communication systems consist of a base transceiver station which communicates with a number of, usually mobile, subsidiary transceiver stations with an area surrounding the base station and constituting a cell of the system.

Conventionally, cellular radio communication systems are categorized as macrocell, microcell or pico cell according to the nominal radius of the cells constituting the system. Macrocell systems have cells with radii of over 1 km, microcell systems have cells with radii in the range of 100 m to 1 km and picocell systems have cell radii in the range 30 m to 100 m. A form of cellular radio communication system with a still smaller cell size is coming into use and has been given the designation "personal". Such systems have cell radii less than 30 m, and typically less than 3 m. A few personal cells may be considered together as a "group" cell.

In personal/groups cells the usage of individuals resources levels (area used over time, frequencies used, cell size, bandwidth allocated, and services) and interference are monitored by the system. This information may then be used to optimise the performance of the system (capacity level, resource usage, power).

In macro, micro and pico cell systems, the nominal sizes of the cells and the frequencies upon which the base stations operate are determined during the initial setting up and commissioning of the system concerned.

In personal cellular radio communication systems on the other hand, the cell size' and its characteristic frequency may be assigned to a specific user of the system and not to a base station in a fixed location.

The present invention, although applicable to all types of cellular radio communication systems, is particularly useful in connection with personal cellular radio communication systems.

According to the present invention there is provided a method of optimising the operation of a cellular radio communication system, including the operations of monitoring the positions of services used and frequency of calls made by user stations within cells in a region of the cellular radio communication system, establishing a dynamic user profile data base related thereto, and varying the characteristics of the cells in the said region of the radio communication system in response to data derived from the user profile data base so as to allocate resources to the cells as a function of the demands made by the user stations within the cells.

The word "dynamic" is used to indicate that the information in the data base is updated regularly.

The said resources may include the sizes of the cells and/or the number of traffic channels and available within the cells. Preferably there is included also the operations of monitoring the level of interference within the cells in the said region of the cellular communication system, producing an interference probability distribution function related thereto, and routing calls to avoid those cells in which the levels of interference are highest.

There may be included also the operations of producing a location probability distribution function for specific users of the system so that calls initially routed to those cells where experience has shown that the specific users are most likely to be. Also, the handover sequences for those cells can be recorded in the user profile data base so that they can be initiated at the same time that a request for service is received by the base transceiver station of the cell concerned.

The above operations are applicable particularly in the case of the smallest cell size systems (pico and personal) because most users of such systems tend to remain in well defined positions, or to move only locally.

Also according to the invention there is provided A cellular radio communication system wherein there is provided a base service transceiver station, serving a region of the cellular radio communication system, a central transceiver station in communication with the base service station, a plurality of subsidiary transceiver units in communication with the central transceiver station and a user station in communication with an associated subsidiary transceiver, to form a cell of the cellular radio communication system, wherein the base service transceiver station includes a central processing unit adapted to monitor continuously the positions of, services used and frequency of calls made by the user stations in the said region of the cellular radio communication system at regular intervals store data relating thereto in a user profile data store and produce operating signals adapted to cause the central transceiver station to vary the characteristics of the cells in the said region of the cellular radio communication system in response to the operating signals so as to allocate resources to the cells as a function of the demands made by the user stations within the cells of the cellular radio communication system. The invention will now be described, by way of example, with reference to the accompanying drawings which, FIG. 1 is a flow chart of a system embodying the invention for optimising the operation of a cellular radio communication system.

Figure 2:
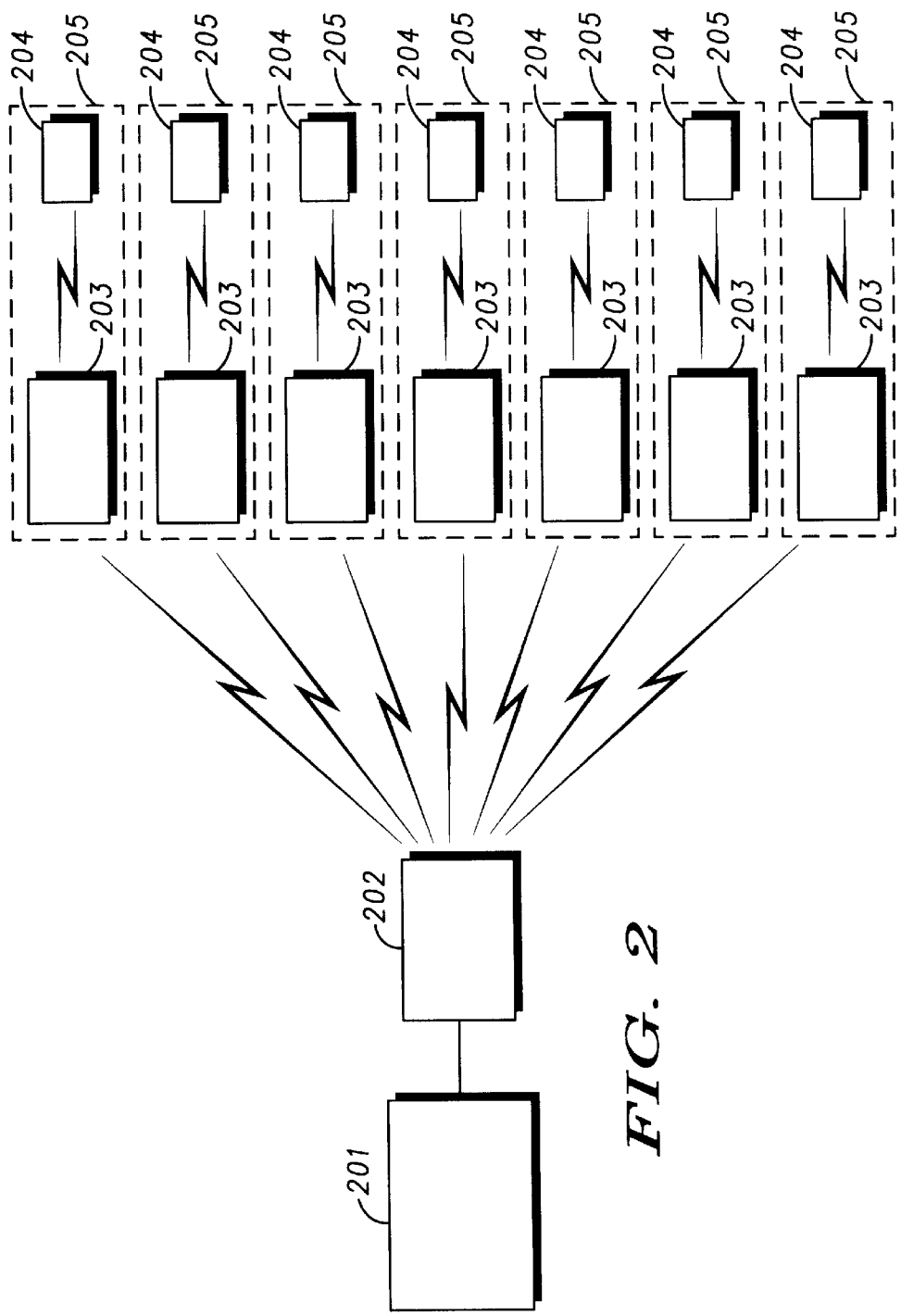
Figure 3:
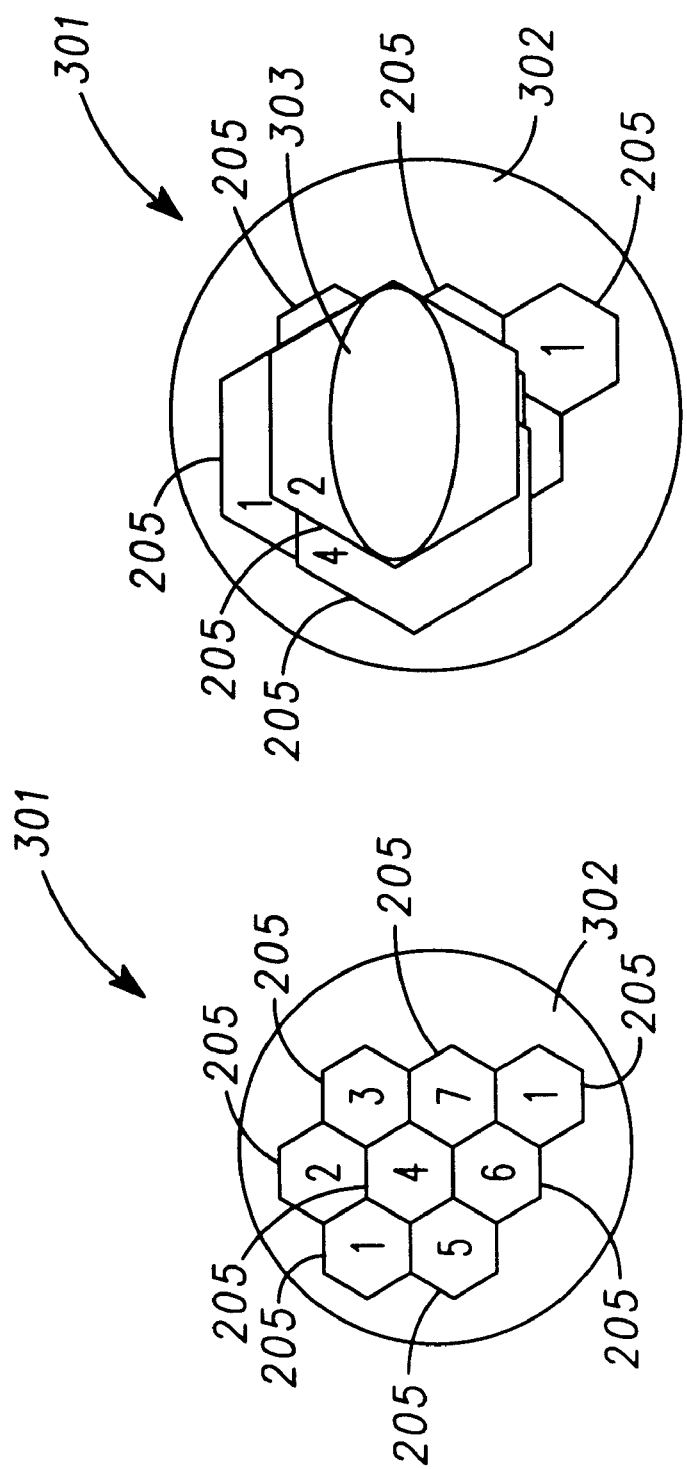

FIG. 2 shows, schematically, the layout of a personal cell size cellular radio communication system, and FIG. 3 shows how the system of FIG. 2 can react to accommodate changes in the distribution of users of the system within a region of the system.

Referring to FIG. 1, the traffic within a region of a cellular radio communication system is monitored continuously by a base service station (not shown) for that region of the cellular radio communication system (also not shown). The base service station monitors the positions of users of the radio communication system, the services they request, the frequency requested and that actually used. Also monitored continuously for the cells within the region served by the base service station are the signal to interference ratios of the traffic channels used, the signal strengths and the number of requests for alternative traffic channels made by users of the cellular radio communication system (Stage 1). This information is stored in a user profile data base which is updated at regular intervals (Stage 2). Information is extracted from the store and used to predict the probable location of one or more users of the system, the carrier requirements and the most appropriate frequencies to be used (Stage 3). This data is used to reconfigure the cell, or cells, the user or users of the system and possibly to page the cell or cells in which the user or users of the system are most likely to be found. (Stages 4 and 5), contact having been made, communication links are established in the usual way. (Stages 6 and 7).

Once sufficient information has been collected concerning the whole population of users, the optimum frequency allocation and cell sizes for the system can be determined. As the system develops this allocation can be adapted to meet any new requirements.

One possible use of the information would be to modify the size of cells to decrease the trunking loss of a personal cell radio communications system, as illustrated in FIG. 3.

FIG. 2 shows a conceptual personal radio cellular communication system embodying the invention. Referring to FIG. 2, a base service station 201, in which the above described operations are carried out, communicates with a central transceiver station 202. The central transceiver station 202 in turn communicates with a network of subsidiary transceiver units 203, each of which form the base transceiver station serving a single user station 204 in a cell 205 of the personal cellular radio communication system. The central transceiver station 202 is so positioned that communication with the subsidiary transceiver units 203 is supportable by an RF channel and the subsidiary transceiver units 203 are so positioned as to have communication with their respective user stations 204 which is supportable also by an RF channel. Other than RF frequencies can be used to communicate between the central transceiver station 202 and the subsidiary transceiver units 203, and between them and the user stations 204. Also, the central transceiver station 202 can be linked to the subsidiary transceiver units 203 by land line.

FIG. 3 illustrates the reaction of the base service station 201 of such a system in response to the movement of one or more user station 204 from its normal position. Referring to FIG. 3, there is shown a region 301 of a cellular radio communication system such as that described with reference to FIG. 2, in which there is a cell re-use pattern of seven cells 205. Also, there is an overlay cell 302 which is used to carry signals which are common to all the cells in the region 301 of the cellular radio communication system. Initially, the identity and usage status of all the user stations 204. (Not shown in the figure) in the region 301 of the cellular radio communication system is known by the base service station 201. FIG. 3 shows one way which the base service station 201 can deal with the situation when three of the user stations 204 (Those of cells 1, 2 and 4) move away from their normal positions and congregate in an area 303.

The base service station 201 causes the respective subsidiary transceiver units 203 to increase their power outputs so that the size of their associated cells (1, 2 & 4) increases and an overlap region is created which encompasses the area 303 in which the user stations of the cells 1, 2 and 4 have congregated. A consequent loss of traffic carrying capacity occurs and this is rectified by increasing the area of the overlay cell 303 and passing some of the traffic through it.

If one of the user stations 204 begins to become mobile within its cell 205 then the base service station 201 can cause the size of that cell 205 to be increased to allow for the increased mobility of the mobile user station 204, so delaying the need for handover to an adjacent cell 205. When this does become necessary, the power level of the base transceiver station of the first cell 205 can be reduced, so conserving power and reducing interference.

The new cell 205 can either operate on the same frequency as the original cell 205 (i.e. the frequency associated with the identified user station 204 of that cell) or the frequency associated with the user station 204 of the new cell 205. If the same frequency is used, then the separation of the antennas associated with the subsidiary transceiver unit 203 forming the base stations of the two cells can be used to provide spatial diversity.

What is claimed is:

1. A method of optimizing the operation of a cellular radio communication system, comprising:

monitoring the positions of services used and frequency of calls made by user stations within cells in a region of the cellular radio communication;

establishing a dynamic user profile data base related thereto;

varying the characteristics of the cells in the said region of the radio communication system in response to data derived from the user profile data base so as to allocate resources to the cells as a function of the demands made by the user stations within the cells;

monitoring the level of interference within the cells in the said region of the cellular radio communication system;

producing an interference probability distribution function related thereto; and routing calls to avoid those cells in which the level of interference is highest.

2. A method according to claim 1 further comprising:

producing a location probability distribution function for specific users of the cellular radio communication system; and initially routing incoming calls for those users of the system to cells where the probability distribution function indicates they are most likely to be.

3. A method according to claim 2 wherein handover sequences for the cells are recorded in the user profile data base, the method further comprising initiating handover simultaneously with the reception by a base transceiver station of the cells concerned of a request for service involving a specified user of the system in those cells 4. A method according to claim 1 further comprising determining from data held in the user profile data base the optimum allocation of radio frequency and size of cell for individual users of the cellular radio communication system.

5. A method according to claim 4 further comprising modifying a size of a particular cell of the system in response to information derived from the user profile data store relating to a movement of the specified user of the system associated with that cell.

6. A method according to claim 5 further comprising determining when a particular cell is not in use and reducing the power output of the base transceiver unit of that cell during the period for which the cell is unused.

7. A cellular radio communication system comprising:

a base service transceiver station, serving a region of the cellular radio communication system;

a central transceiver station in communication with the base service station;

a plurality of subsidiary transceiver units in communication with the central transceiver station;

a user station in communication with an associated subsidiary transceiver to form a cell of the cellular radio communication system; and wherein the base service transceiver station comprises a central processing unit adapted to and frequency of calls made by the user stations in the said region of the cellular radio communication system at regular intervals, store data relating thereto in a user profile data store and produce operating signals adapted to cause the central transceiver station to vary the characteristics of the cells in the said region of the cellular radio communication system in response to the operating signals so as to allocate resources to the cells as a function of the demands made by the user stations within the cells of the cellular radio communication system, monitor the level of interference within the cells in the said region of the cellular radio communication system, produce an interference probability distribution function related thereto; and route calls to avoid those cells in which the level of interference is highest.

8. A cellular radio communication system according to claim 7 wherein the operating signals produced by the base service transceiver station cause the central transceiver station to vary the size of/and the number of traffic channels available within the cells of the region of the cellular radio communication system.

9. A cellular radio communication system according to claim 7 wherein the central control transceiver station communicates with the subsidiary transceiver units via radio frequency links.

10. A cellular radio communication system according to claim 7 wherein the central transceiver station is linked to the subsidiary transceiver units by land lines.

11. A cellular radio communication system according to claim 7 wherein a single user station is associated with a subsidiary transceiver unit to form a personal cell within the radio communication system.

12. A cellular radio communication system according to claim 1 wherein a number of contiguous personal cells are encompassed by an overlay cell and communications between the central transceiver station the cells with the overlay cell are passed through the overlay cell.

13. A cellular radio communication system according to claim 12 further comprising a facility for amalgamating personal cells to form a group cell.

* * * * *

UNITED STATES PATENT AND TRADEMARK OFFICE
CERTIFICATE OF CORRECTION

PATENT NO. : 6,507,569 B1
DATED : January 14, 2003
INVENTOR(S) : Crichton

It is certified that error appears in the above-identified patent and that said Letters Patent is hereby corrected as shown below:

<u>Column 4,</u>
Line 18, reads "services used", should be -- user stations --.

<u>Column 5,</u>
Line 9, after "adapted to", please insert -- monitor continuously the position of user stations, the services used --.

<u>Column 6,</u>
Line 17, reads "claim 1", should be -- claim 11 --.
Line 22, reads "claim 12", should be -- claim 11 --.

Signed and Sealed this

Seventeenth Day of June, 2003

JAMES E. ROGAN
*Director of the United States Patent and Trademark Office*